(12) United States Patent
Irie et al.

(10) Patent No.: US 7,100,471 B2
(45) Date of Patent: Sep. 5, 2006

(54) BICYCLE CONTROL DEVICE

(75) Inventors: Yoshinori Irie, Osaka (JP); Hisayuki Sato, Osaka (JP)

(73) Assignee: Shimano Inc., Osaka (JP)

( * ) Notice: Subject to any disclaimer, the term of this patent is extended or adjusted under 35 U.S.C. 154(b) by 241 days.

(21) Appl. No.: 10/369,109

(22) Filed: Feb. 20, 2003

(65) Prior Publication Data

US 2004/0163486 A1    Aug. 26, 2004

(51) Int. Cl.
*G05G 11/00* (2006.01)
*F16C 1/10* (2006.01)

(52) U.S. Cl. ...................................... 74/502.2; 192/217

(58) Field of Classification Search .............. 74/502.2, 74/473.3, 489; 192/217
See application file for complete search history.

(56) References Cited

U.S. PATENT DOCUMENTS

| | | | |
|---|---|---|---|
| 3,478,617 A | 11/1969 | Maeda | |
| 4,100,820 A | 7/1978 | Evett | |
| 4,132,296 A | 1/1979 | Evett | |
| 4,325,267 A | 4/1982 | Kojima | |
| 4,425,819 A | 1/1984 | Shimano | |
| 5,050,444 A * | 9/1991 | Nishimura | 74/502.2 |
| 5,241,878 A | 9/1993 | Nagano | |
| 5,257,683 A | 11/1993 | Romano | |
| 5,400,675 A | 3/1995 | Nagano | |
| 5,479,776 A | 1/1996 | Romano | |
| 5,609,064 A * | 3/1997 | Abe | 74/502.2 |
| 5,806,372 A | 9/1998 | Campagnolo | |
| 6,073,730 A | 6/2000 | Abe | |
| 6,142,281 A | 11/2000 | Campagnolo | |
| 6,216,078 B1 | 4/2001 | Jinbo et al. | |
| 2001/0053724 A1 | 12/2001 | Campagnolo | |

FOREIGN PATENT DOCUMENTS

| | | |
|---|---|---|
| DE | 3136922 A1 | 3/1983 |
| EP | 0 371 254 A2 | 6/1990 |
| EP | 1264765 A1 | 12/2002 |
| EP | 1 342 655 A2 | 9/2003 |
| JP | 50120147 U | 10/1975 |
| JP | 56129388 U | 10/1981 |
| JP | 56132192 U | 10/1981 |
| JP | 62161097 U | 10/1987 |
| JP | 63189792 U | 12/1988 |
| JP | 3283289 B2 | 3/2002 |

OTHER PUBLICATIONS

Reference A (STI): Drawings of model ST-7700-c by Road Bike Component Technology.*
Reference B (Dura-Ace): http://dura-ace.shimano.com/publish/content/duraace/en/home/history/7700.html.*
Shimano Technical Information Documents for ST-7700; available in U.S. in 2002.

* cited by examiner

*Primary Examiner*—Chong H. Kim
(74) *Attorney, Agent, or Firm*—Global IP Counselors, LLP

(57) ABSTRACT

A control device is configured to be attached to the handlebar of a bicycle for controlling a brake mechanism and change speed mechanism. The control device comprises a bracket fixed to the handlebar, a brake lever pivotally coupled crosswise relative to the bracket and a release lever. The brake mechanism is controlled by fore and aft pivotal movement of the brake lever, while the change speed mechanism is controlled by sideways pivotal movement of the brake lever and the release lever. The brake lever and the release lever are further configured relative to the bracket for smooth easy operation by the rider.

24 Claims, 7 Drawing Sheets

BICYCLE CONTROL DEVICE

BACKGROUND OF THE INVENTION

1. Field of the Invention

This invention generally relates to a bicycle control device for shifting gears to change the speed of the bicycle. More specifically, the present invention in a preferred embodiment relates to a bicycle control device that includes both braking and/or speed changing functions.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle. Control devices for braking and/or shifting have been extensively redesigned in recent years.

In the past, brake levers and shifting devices were separate devices that were attached to the handlebar and/or frame of the bicycle. More recently, control devices have been developed the combine both the braking and shifting functions into a single unit. Examples of such control devices of this type are disclosed in the following U.S. Pat. Nos. 4,241,878; 5,257,683; 5,400,675; and 6,073,730. For effecting braking and speed change, some of these known control devices have a brake lever that also acts as a shift lever that winds a takeup element and a release lever located behind a brake/shift lever. While other known control devices have a shift lever that winds a takeup element located behind a brake lever and a release lever that is located laterally of the brake lever. Thus, the rider can carry out braking and speed change operations without the rider changing from one lever to another and without the possibility of rider injuring a finger. In particular, these control devices have a support member with a mounting portion configured to be coupled to the handlebar of the bicycle and a control lever that is pivotally coupled to the support member to move between a rest position and a shifting position about a shift pivot axis.

However, the control devices illustrated in these patents have a large angle between the shift pivot axis and the operating portion of the shift lever used to wind the shift cable. This arrangement results in the rider having to push the shift lever along a path that can be difficult for some riders. Likewise, the release levers of the control devices illustrated in these patents are not arranged in the most advantageous position for the rider to operate. Thus, the release lever of the control devices illustrated in these patents can be difficult for some riders to operate.

In view of the above, it will be apparent to those skilled in the art from this disclosure that there exists a need for an improved control device. This invention addresses this need in the art as well as other needs, which will become apparent to those skilled in the art from this disclosure.

SUMMARY OF THE INVENTION

One object of the present invention is to provide a control device that is easy to shift.

Another object of the present invention is to provide a compact and inexpensive bicycle control device that allows the rider to carry out braking and speed change operations without difficulty.

The foregoing objects can basically be attained by providing a bicycle control device comprising a support member, a cable winding mechanism, and a control lever. The support member has a mounting portion configured and arranged to be coupled to a bicycle handlebar and a distal end longitudinally spaced from the mounting portion. The cable winding mechanism is coupled to the support member, and has a cable attachment point. The control lever is operatively coupled to the cable winding mechanism. The control lever includes an attachment end portion and a shift operating portion extending outwardly from the distal end of the support member. The attachment end portion of the control lever is pivotally coupled to the support member to move between a rest position and a shifting position about a shift pivot axis that extends longitudinally between the mounting portion and the distal end. The shift operating portion of the control lever is configured and arranged to be disposed along a line that is angled relative to the shift pivot axis by approximately an angle between forty-five degrees and fifty-five degrees at the rest position and that passes through the attachment end portion at the shift pivot axis.

The foregoing objects can basically be attained by providing a bicycle control device comprising a support member, a cable winding mechanism, and a brake/shift lever. The support member has a mounting portion configured and arranged to be coupled to a bicycle handlebar. The cable winding mechanism is coupled to the support member, and has a cable attachment point. The brake/shift lever is operatively coupled to the cable winding mechanism. The brake/shift lever includes an attachment end portion and a brake/shift operating portion extending outwardly from the support member. The attachment end portion of the brake/shift lever is pivotally coupled to the support member about a shift pivot axis to move between a rest position and a shifting position. The attachment end portion of the brake/shift lever further is pivotally coupled relative to the support member about a brake pivot axis that is angled relative to the shift pivot axis. The shift operating portion of the brake/shift lever is configured and arranged to be disposed along a line that is angled relative to the shift pivot axis by approximately an angle between forty-five degrees and fifty-five degrees at the rest position and that passes through the attachment end portion at the shift pivot axis.

The foregoing objects can basically be attained by providing a bicycle control device comprising a support member, a cable winding mechanism, and a control lever. The support member has a mounting portion configured and arranged to be coupled to a bicycle handlebar and a distal end longitudinally spaced from the mounting portion. The cable winding mechanism is coupled to the support member, and having a cable attachment point. The control lever is operatively coupled to the cable winding mechanism. The control lever includes an attachment end portion and a shift operating portion extending outwardly from the distal end of the support member. The attachment end portion of the control lever is pivotally coupled to the support member to move between a rest position and a shifting position about a shift pivot axis that extends longitudinally between the mounting portion and the distal end. The mounting portion has a clamping plane extending perpendicularly from the bicycle handlebar to intersect with the shift pivot axis at an intersection point to form an acute angle as measured upwardly from the clamping plane and on a forward side of the shift pivot axis that away from the mounting portion.

The above objects are preferably achieved, according to the present invention, by a control device for a bicycle having a brake mechanism and a change speed change mechanism, comprising a brake lever assembly mounted on a handlebar for controlling the brake mechanism, wherein the speed change mechanism is controllable by movement of at least a portion of the brake lever assembly.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
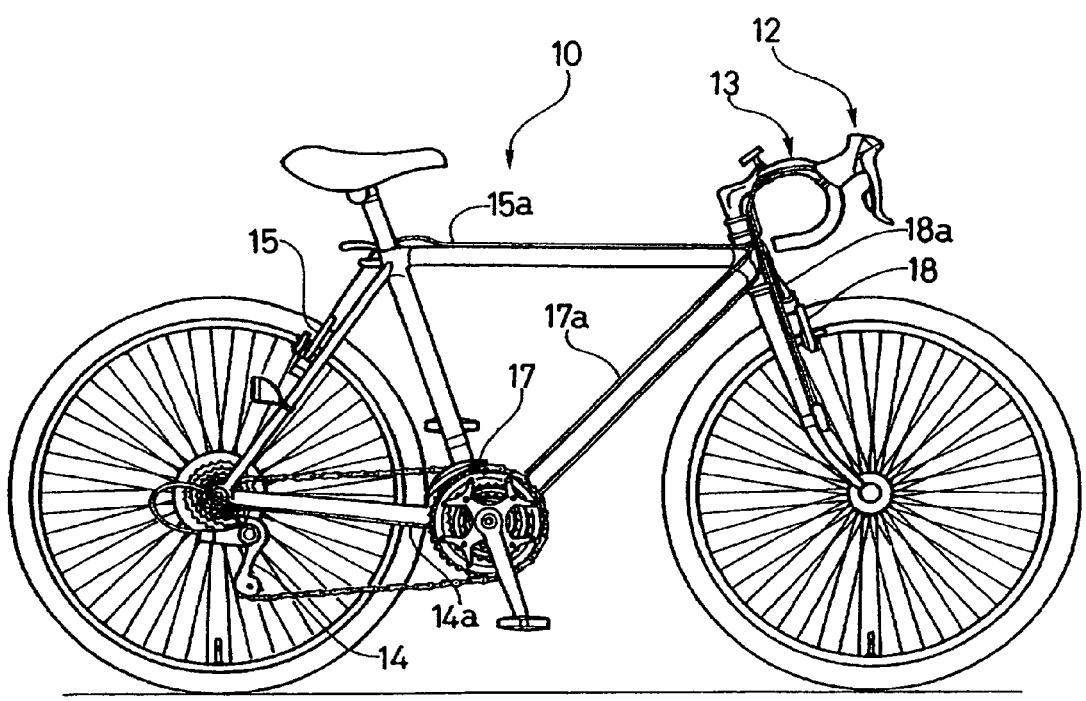
FIG. 1 is a side elevational view of a bicycle equipped with a pair of control devices (only one shown) in accordance with one embodiment of the present invention.

Referring initially to FIG. 1, a bicycle 10 is illustrated with a pair of control devices 12 (only one shown in FIG. 1) mounted in a bicycle handlebar 13 in accordance with one embodiment of the present invention. The right hand side control device 12 is operatively coupled to a rear derailleur 14 via a shift cable 14a and a rear braking device 15 via a brake cable 15a, while the left hand side control device 12 is operatively coupled to a front derailleur 17 via a shift cable 17a and a front braking device 18 via a brake cable 18a. The right and left hand side control devices 12 are essentially identical in construction and operation, except that that are mirror images and the number of shift positions are different. Thus, only one of the control devices 12 will be discussed and illustrated herein. Each control device 12 is also preferably provided with an electronic shifting unit 18 with a pair of shift buttons that are operatively coupled to a cycle computer, preferably in accordance with U.S. Pat. No. 6,073,730 (assigned to Shimano, Inc.) and U.S. Pat. No. 6,216,078 (assigned to Shimano, Inc.).

As used herein to describe the control device 12, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the control device 12 of the present invention.

Since these most of the parts of the bicycle 10 are well known in the art, the parts of the bicycle 10 will not be discussed or illustrated in detail herein, except for the parts relating to the control devices 12 of the present invention. Moreover, various conventional bicycle parts such as brakes, derailleurs, additional sprocket, etc., which are not illustrated and/or discussed in detail herein, can be used in conjunction with the present invention.

Figure 5:
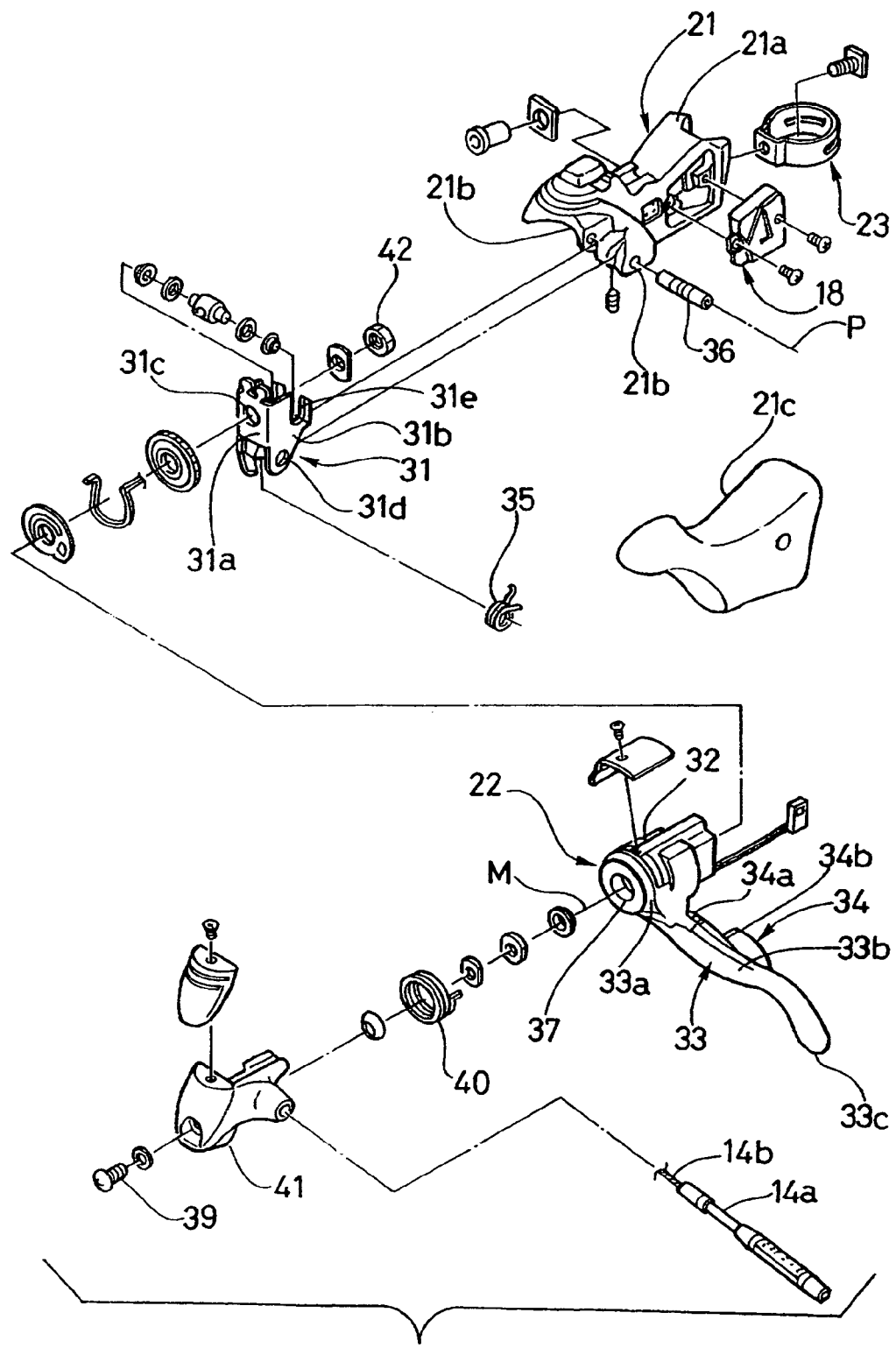
FIG. 5 is a partially exploded perspective view of the right hand side control device illustrated in FIGS. 1–4 in accordance with the present invention.
Figure 6:
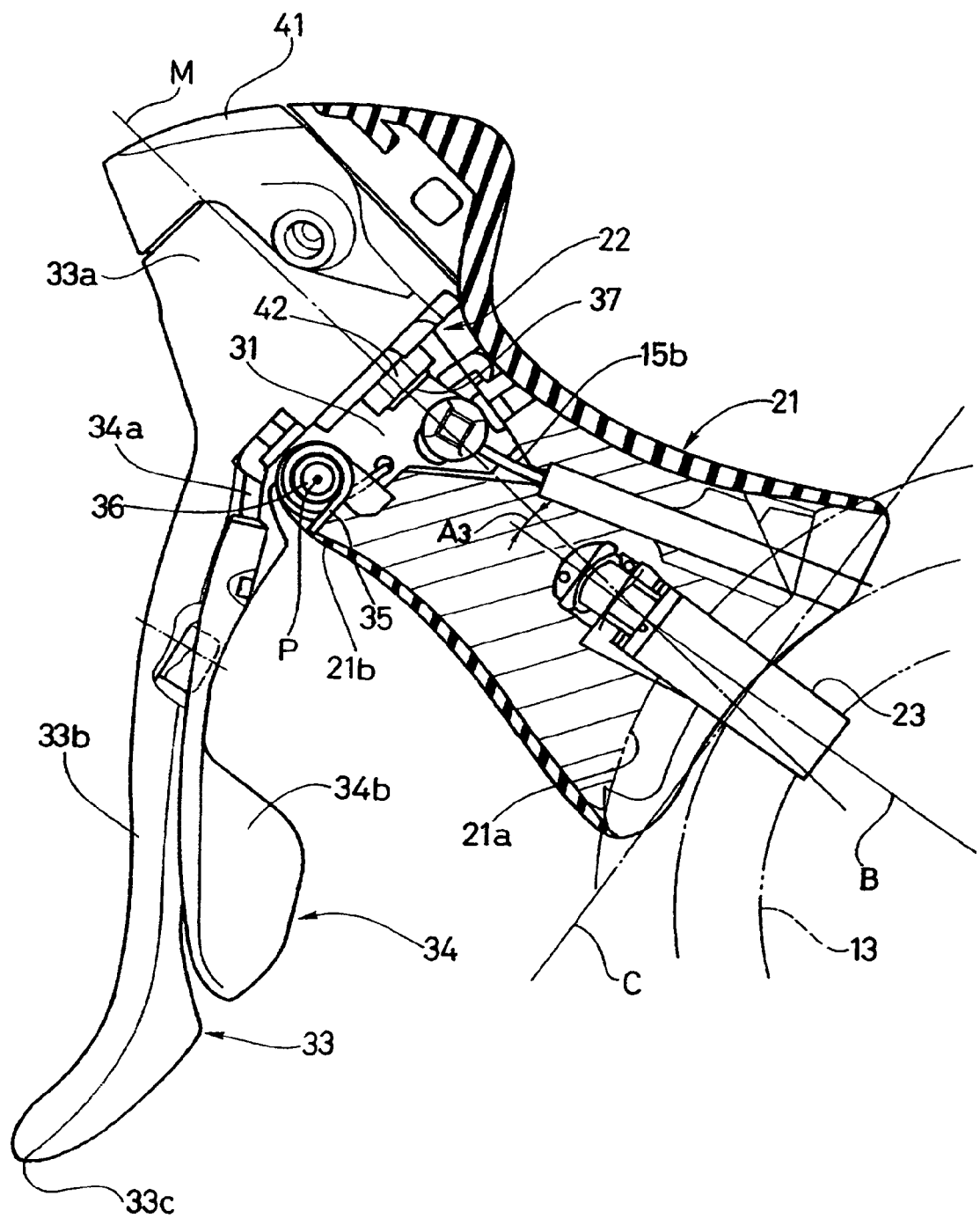
FIG. 6 is an enlarged side elevational of the right hand side control device illustrated in FIGS. 1–5 with a portion shown in cross section.

As best seen in FIG. 5, the bicycle control device 12 basically comprises a support member or bracket 21 and a braking/shifting mechanism 22. The support member 21 is configured and arranged to be fixedly coupled to the bicycle handlebar 13. The braking/shifting mechanism 22 is movably mounted to the support member 21. The braking/shifting mechanism 22 basically operates in the same manner as described in U.S. Pat. No. 6,216,078 (assigned to Shimano, Inc.). Thus, the details of the construction and operation of the braking/shifting mechanism 22 will be omitted. However, the support member 21 and the braking/shifting mechanism 22 have been configured and arranged in the present invention to improve shifting. Accordingly, the braking/shifting mechanism 22 will only be discussed and illustrated in sufficient detail to make and use the present invention.

The support member 21 is configured as a box-shaped bracket that facilitates gripping. The support member 21 includes a mounting end portion 21a configured and arranged to be coupled to the bicycle handlebar 13 and a distal end portion 21b longitudinally spaced from the mounting end portion 21a. A cover 21c is disposed over the support member 21. The mounting end portion 21a has a band element or clamp 23 secured to the bicycle handlebar 13. The distal end portion 21b of the support member 21 has a pivot pin bore 21d that pivotally supports the braking/shifting mechanism 22 to the support member 21.

The braking/shifting mechanism 22 basically comprises a base member or adapter 31, a cable winding mechanism 32, a control (brake/shift) lever 33 and a release (shift) lever 34. The control (brake/shift) lever 33 is operatively coupled to the cable winding mechanism 32 to wind or pull the wire 14b to shift the rear derailleur 14, while the release (shift) lever 34 is operatively coupled to the cable winding mechanism 32 to unwind or release the wire 14b to shift the rear derailleur 14. The braking/shifting mechanism 22 is pivotally connected to the support member 21 by a pivot pin 36 about a brake pivot axis P, which is a non-shift pivot axis. A torsion spring or biasing element 35 is mounted on the pivot pin 36 with one end of the torsion spring 35 engaging the base member 31 and the other end of the torsion spring 35 engaging the support member 21 to urge the braking/shifting mechanism 22 from a braking position to a normal rest position. In particular, the braking/shifting mechanism 22 is basically pivoted by the rider pulling or squeezing the control (brake/shift) lever 33 toward the handlebar 13. Thus, the control (brake/shift) lever 33 pivots relative to the support member 21 between the braking position and the normal rest position.

Shifting, on the other hand, is basically performed by pivoting the control (brake/shift) lever 33 about a main shift pivot axis M, or pivoting the release (shifting) lever 34 about a secondary shift pivot axis S. The main shift pivot axis M extends longitudinally between the mounting end portion 21a and the distal end portion 21b of the support member 21. In the illustrated embodiment, the main shift pivot axis M and the secondary shift pivot axis S are parallel.

Figure 2:
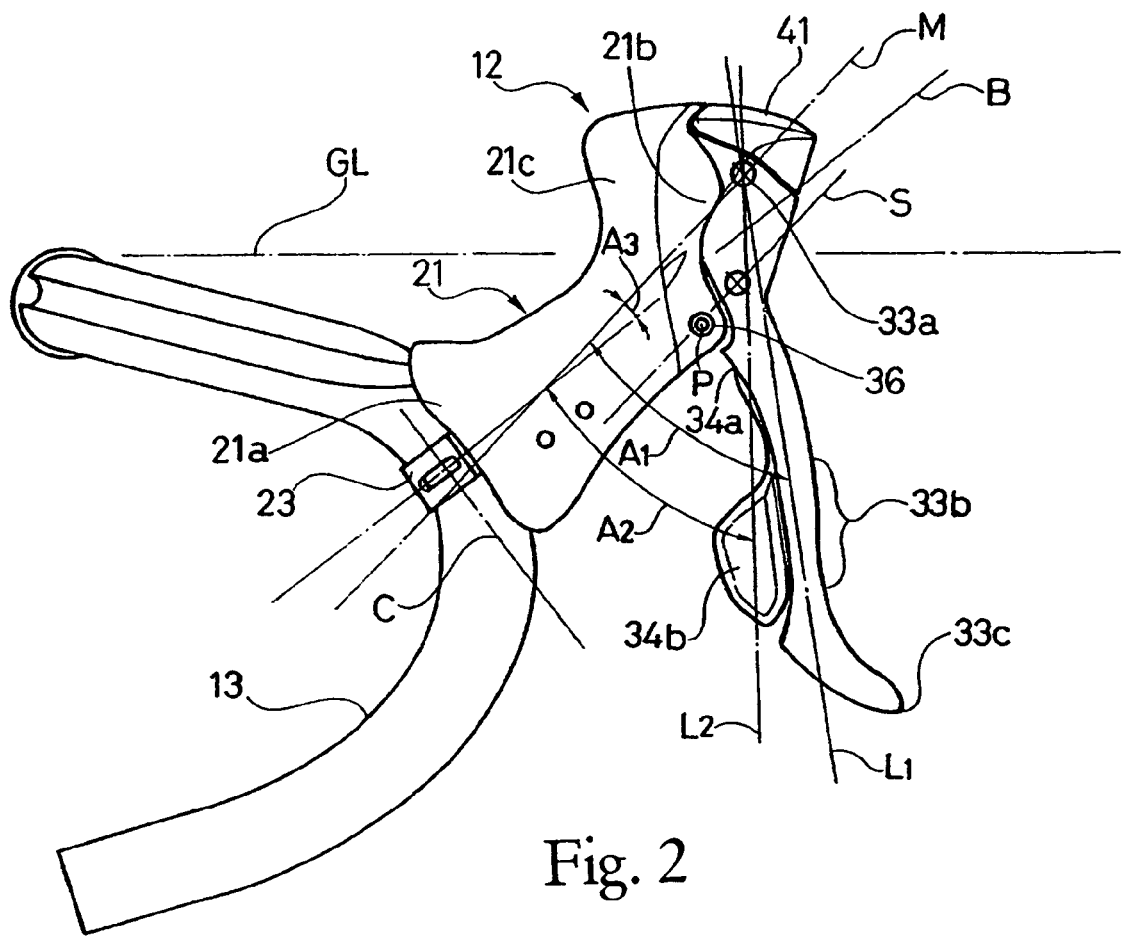
FIG. 2 is a side elevational view of the handlebar and the right hand side control device illustrated in FIG. 1 in accordance with the present invention.
Figure 3:
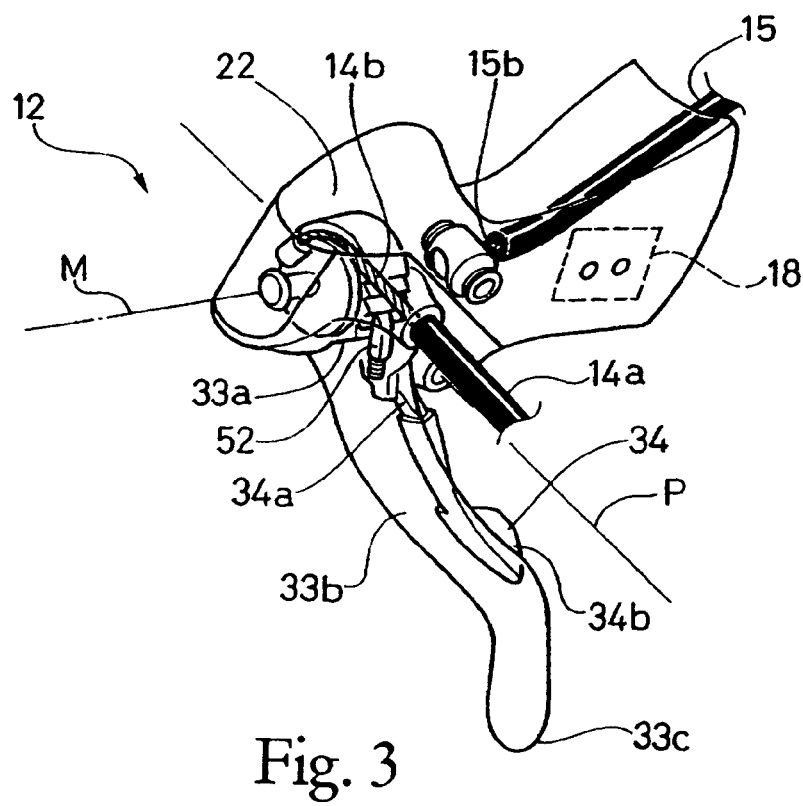
FIG. 3 is a diagrammatic perspective view of the right hand side control device illustrated in FIGS. 1 and 2 in accordance with the present invention.
Figure 4:
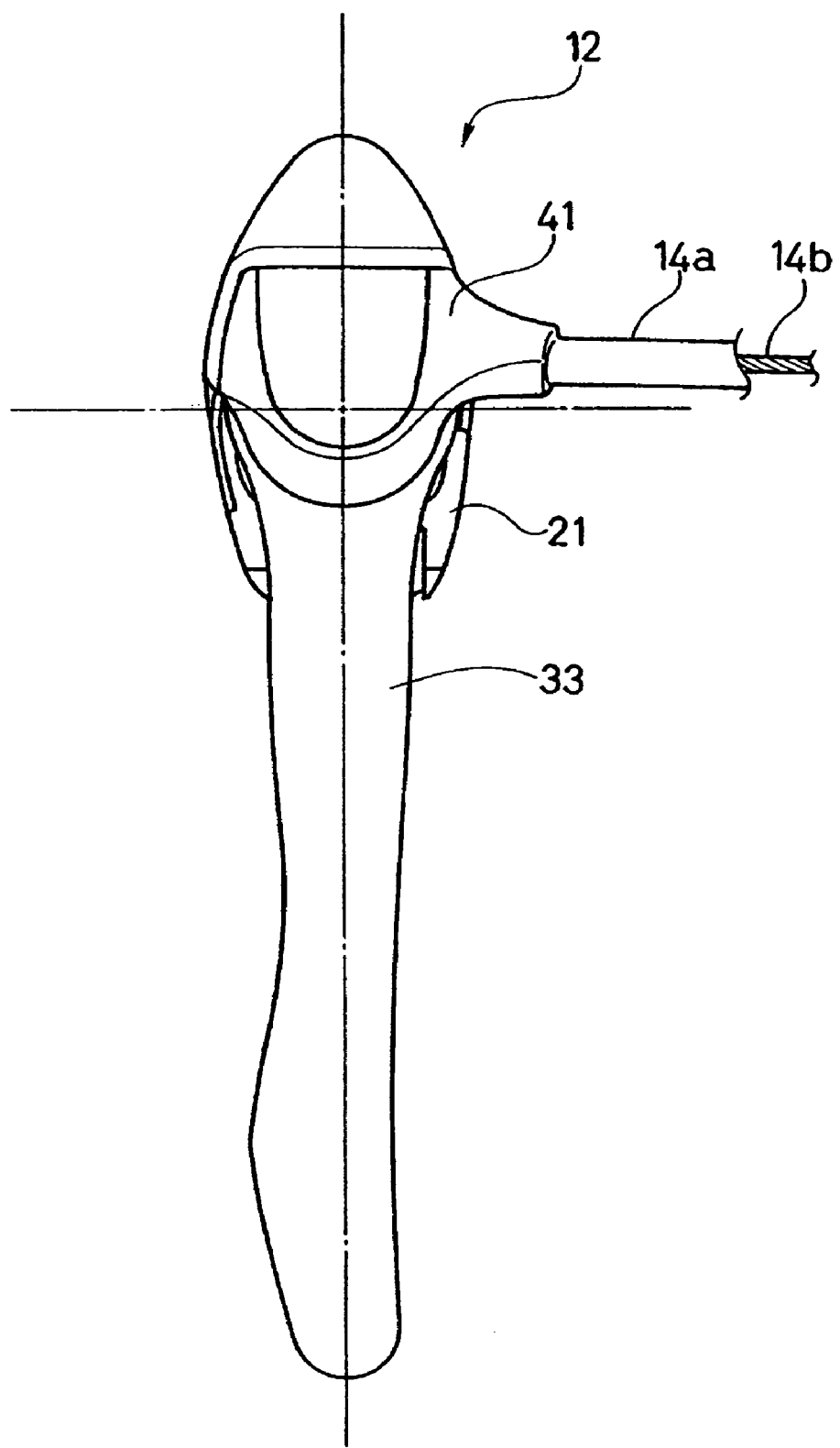
FIG. 4 is a front elevational view of the right hand side control device illustrated in FIGS. 1–3 in accordance with the present invention.

The control (brake/shift) lever 33 has an attachment end portion 33a, a shift operating portion 33b and an extreme free end portion 33c. The attachment end portion 33a of the control (brake/shift) lever 33 is pivotally coupled to the support member 21 to move between a normal rest position and a shifting position about the main shift pivot axis M. The shift operating portion 33b extends outwardly from the distal end portion 21b of the support member 21. As seen in FIG. 2, the shift operating portion 33b of the control (brake/shift) lever 33 is configured and arranged to be disposed along a line $L_1$ that passes through the attachment end portion 33a at the main shift pivot axis M. The line $L_1$ of the shift operating portion 33b of the control (brake/shift) lever 33 represents the center longitudinal axis of the shift operating portion 33b. This line $L_1$ of the shift operating portion 33b of the control (brake/shift) lever 33 is angled relative to the main shift pivot axis M by approximately an angle $A_1$ that is between forty-five degrees and fifty-five degrees at the rest position. This arrangement allows for the rider to easily operate the control (brake/shift) lever 33.

Still referring to FIG. 2, the bicycle control device 12 is secured to the handlebar 13 by the clamp 23 such that the tip of the extreme free end portion 33c of the control (brake/shift) lever 33 is aligned with the free end of the handlebar 13 as seen in FIG. 2. Also, when the bicycle control device 12 is mounted in this position, the main shift pivot axis M forms a forty-seven degree angle with a ground level plane GL that represents ground level. The clamp 23 has a center clamping plane B that bisects the clamp 23 and is arranged perpendicular to the center axis C of the portion of the handlebar 13 where the clamp 23 is attached as seen in FIG. 2. Thus, the center clamping plane B extends perpendicularly from the bicycle handlebar 13 to intersect with the main shift pivot axis M at an intersection point to form an acute angle $A_3$ as measured upwardly from the clamping plane B and on a forward side of the main shift pivot axis M that away from the mounting end portion 21a. Preferably, the acute angle $A_3$ measures approximately 4.5 degrees. This arrangement further allows for the rider to easily operate the control (brake/shift) lever 33 and the release lever 34.

The release lever 34 is pivotally mounted on the control (brake/shift) lever 33 between the attachment end portion 33a of the control (brake/shift) lever 33 and the shift operating portion 33b of the control (brake/shift) lever 33. The release lever 34 is operatively coupled to the cable winding mechanism 32 to release the wire 14b of the shift cable 14a as discussed below. The release lever 34 has an attachment end portion 34a and a shift operating portion 34b. The attachment end portion 34a of the release lever 34 is pivotally coupled to the control (brake/shift) lever 33 to move between a normal rest position and a shifting position about the secondary shift pivot axis S. The shift operating portion 34b extends along the rearward side of the shift operating portion 33b of the control (brake/shift) lever 33. The shift operating portion 34b of the release lever 34 is configured and arranged to be disposed along a line $L_2$ that passes through the attachment end portion 33a at the main shift pivot axis M. The line $L_2$ of the shift operating portion 34b of the release lever 34 represents the center longitudinal axis of the shift operating portion 34b. This line $L_2$ of the shift operating portion 34b of the release lever 34 is angled relative to the main shift pivot axis M by approximately an angle $A_2$ that is between forty-five degrees and fifty-five degrees at the rest position. This arrangement allows for the rider to easily operate the release lever 34.

The base member 31 is pivotally supported on the support member 21 by the pivot pin 36. Thus, the base member 31 can not rotate about the main shift pivot axis M. More particularly, the base member 31 is a U-shaped member that has a fixing portion or plate 31a and a pair of brake cable attachment portions or plates 31b extending from the fixing portion or plate 31a. The fixing portion or plate 31a has a fixing hole 31c that is used to secure the cable winding mechanism 32 thereto. The brake cable attachment portions or plates 31b have axially aligned pivot holes 31d that support the pivot pin 36 and axially aligned recesses 31e that define a wire hook or brake attachment point in which the end of the brake wire 15b of the brake cable 15 is attached.

The cable winding mechanism 32 is pivotally coupled to the support member 21 by the base member 31. The cable winding mechanism 32 has a main support member or shaft 37 that defines the main shift pivot axis M and that rotatably supports the attachment end portion 33a of the control (brake/shift) lever 33 via a bearing assembly 38. The bearing assembly 38 and the attachment end portion 33a of the control (brake/shift) lever 33 are removably attached to the support shaft 37 by a fixing screw 39. The control (brake/shift) lever 33 pivots about the main shift pivot axis M that extends perpendicular to the brake pivot axis P. Thus, the control (brake/shift) lever 33 is operatively coupled to the cable winding mechanism 32 to pivot about the main shift pivot axis M. In other words, the control (brake/shift) lever 33 is swingable, for effecting speed change, in a direction perpendicular to the braking movement of the control (brake/shift) lever 33.

A torsion return spring or biasing element 40 is mounted on the fixing screw 39 with one end of the return spring 40 engaging the attachment end portion 33a of the control (brake/shift) lever 33 and the other end of the return spring 40 engaging an outer cap unit 41 that is non-rotatably secured to the support shaft 37 by the fixing screw 39. The return spring 40 applies an urging force to the control (brake/shift) lever 33 in a first rotational direction for biasing the control (brake/shift) lever 33 from a shifting position to a normal rest position.

The base member 31 is secured to the support shaft 37 of the cable winding mechanism 32 by a nut 42 that is threaded on to the end of the support shaft 37. In other words, the end of the support shaft 37 extends through the fixing hole 31c of the fixing plate 31a to secure the cable winding mechanism 32 thereto.

Figure 7:
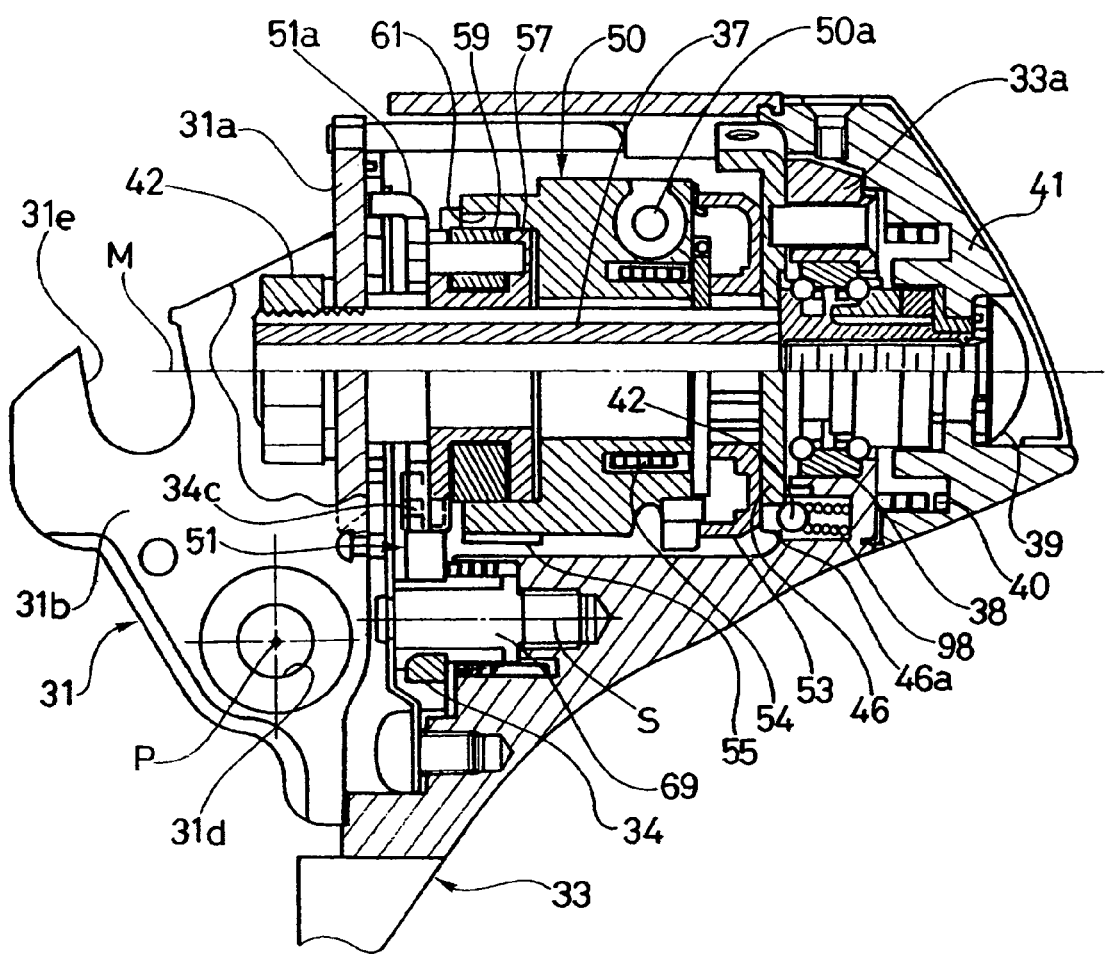
FIG. 7 is a partial cross sectional view of a portion of the right hand side control device illustrated in FIGS. 1–6.
Figure 8:
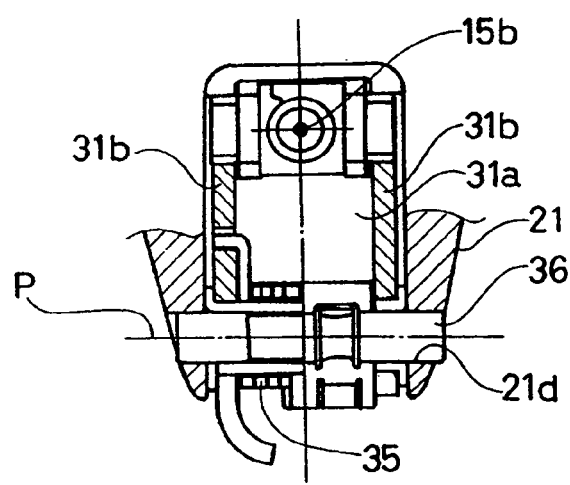
FIG. 8 is a partial cross sectional view of a portion of the right hand side control device illustrated in FIGS. 1–6.

As seen in FIG. 7, a stationary plate 46 with a recess 46a is mounted adjacent the distal end of the support member 21 to be non-rotatable relative thereto. The attachment end portion 33a includes, adjacent its proximal end, a ball 47 for engaging the recess 46a and a lever positioning spring 48 for urging the ball 47 into the recess 46a. This construction acts to maintain the control (brake/shift) lever 33 in a neutral position opposed to the foremost end of the curved portion of the handlebar 13, and to prevent the control (brake/shift) lever 33 from swinging with the release lever 34 when the latter is operated.

Figure 9:
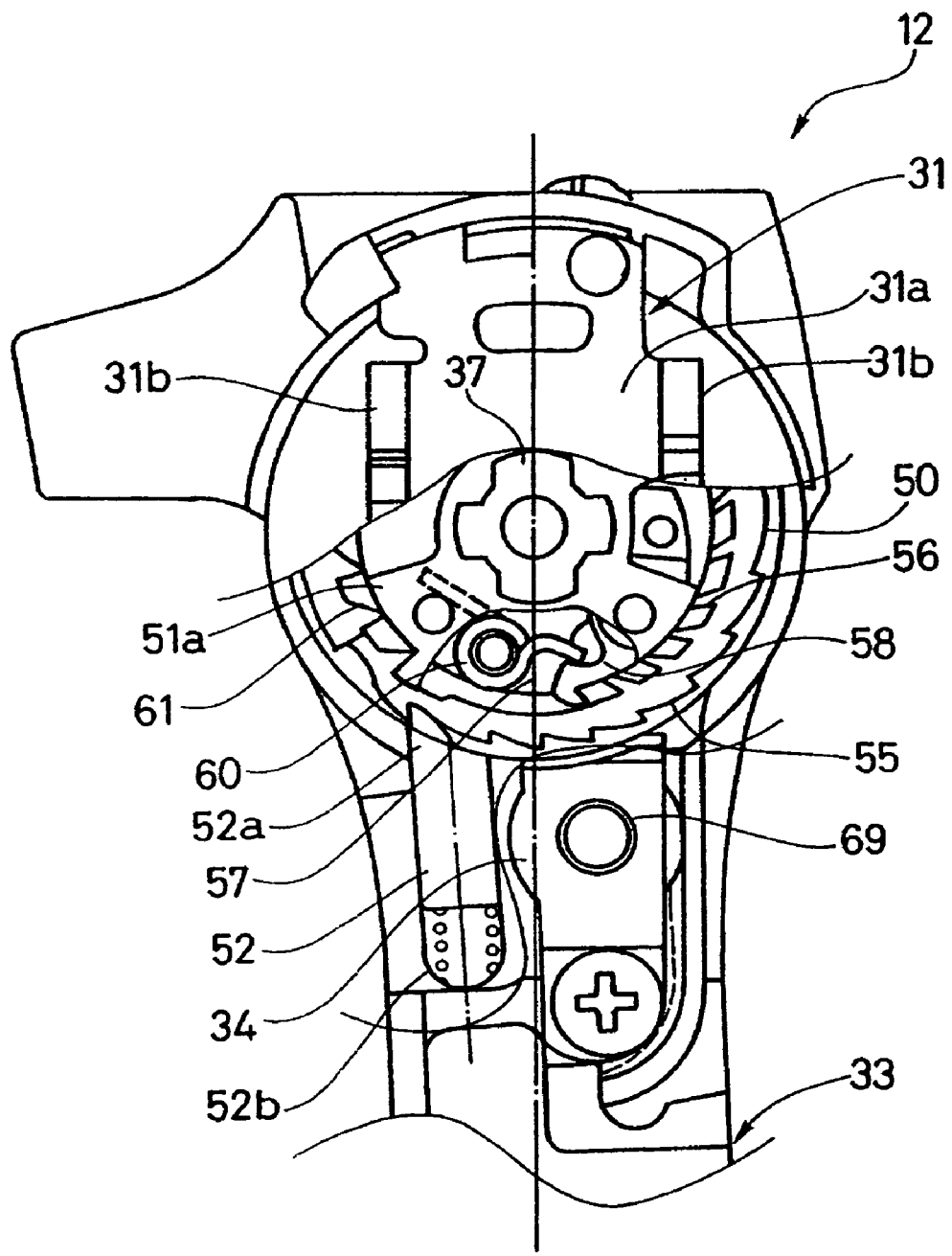
FIG. 9 is a rear elevational view of the portion of the right hand side control device illustrated in FIG. 7 with portions broken away for purposes of illustration.

Referring to FIGS. 7 and 9, the cable winding mechanism 32 further includes a shift wire takeup element 50, a position maintaining mechanism 51 formed by the release lever 34 and a control or release plate 51a, a transmission element 52 coupled to the control (brake/shift) lever 33, and a shift position sensor 53 disposed between the attachment end portion 33a and the takeup element 50. The shift position sensor 53 is used for detecting the current gear position that is engaged. The shift position sensor 53 can be a potentiometer as illustrated.

The takeup element 50 of the cable winding mechanism 32 has an approximately cylindrical shape with a shift cable attachment point 50a in which the end of the shift wire 14b of the shift cable 14a is attached. The takeup element 50 is normal urged in a wire-unwinding direction by a return spring or biasing element 54. In other words, the return spring or biasing element 54 is configured and arranged to apply a biasing force in a first rotational direction to urge the takeup element 50 to rotate in the wire-unwinding direction. The wire takeup element 50 also has a plurality of teeth or driven portions 55 located on the outer peripheral surface and a plurality of teeth or engaging portions 56 on an inside peripheral wall thereof.

As seen in FIG. 9, the transmission element 52 includes an engaging projection 52a at a distal end thereof. The transmission element 52 is biased against the teeth or driven portions 55 of the takeup element 50 by a spring 52b located in a recess of the control (brake/shift) lever 33. Thus, pivotal movement of the control (brake/shift) lever 33 about the main shift pivot axis M causes the takeup element 50 rotate against the force of the return spring 54.

The support shaft 37 further non-rotatably supports a pawl support body 57 that swingably supports a return pawl or engaging member 58 (FIG. 9) and a positioning pawl 59 (FIG. 7). A spring 60 is provided for urging the return pawl 58 toward the engaging portions 56, while a spring (not shown) is provided for urging the positioning pawl 59 away from control recesses 61 that are formed on an inner peripheral surface of the takeup element 50.

The release lever 34 is pivotally connected to the attachment end portion 33a by a pivot pin 69 that defines the secondary pivot axis S. The pivot pin 69 extends parallel to the support shaft 37. The release lever 34 includes a control projection 34c projecting from the proximal end thereof in a direction opposite to the attachment end portion 34a thereof. The control projection 34c engages the control plate 51a that is supported on the support shaft 37. Movement of the release lever 34 rotates the control plate 51a to release the takeup element 50 which is then rotated in the wire-unwinding direction by the return spring 54.

The control plate 51a includes engaging projections for engaging the return pawl 58 and the positioning pawl 59, respectively, to move the return pawl 58 out of engagement and the positioning pawl 59 toward its engaging position when the release lever 34 is swung sideways. The control plate 51a further includes a first cam surface for contacting the engaging projection 52a of the transmission element 52, and a second cam surface for engaging the control projection 34c. The control plate 51a, the return pawl 58 and the positioning pawl 59 operate in the same manner the corresponding elements of the fourth embodiment that is described in U.S. Pat. No. 5,241,878 (assigned to Shimano, Inc.). This allows change speed to be effected with the swinging movement in the direction perpendicular to the direction of pivotal movement of the control (brake/shift) lever 33.

The release lever 34 is disposed in a recess defined in a back face of the attachment end portion 33a. The attachment end portion 34a of the release lever 34 is disposed close to the control (brake/shift) lever 33, projecting toward the handlebar 13 relative to the attachment end portion 33a for facilitating operation. The release lever 34 has a starting position in which one lateral face of the release lever 34 contacts a side surface of the recess of the attachment end portion 33a.

In this illustrated embodiment, the control (brake/shift) lever 33 is pivotable to the braking position with a hand holding the curved portion of the handlebar 13 or the support member 21. The control (brake/shift) lever 33 makes a pivotal movement on the brake pivot axis P. This pivotal movement of the control (brake/shift) lever 33 pulls the brake wire 15b thereby to brake the bicycle 10. The control (brake/shift) lever 33 can be swung sideways from the starting or rest position to provide a selected low speed, and returns to the starting or rest position under the force of the return spring 40 upon release. The release lever 34 can be swung sideways from its starting or rest position to provide a selected high speed, and returns to the starting or rest position under the forces of the spring urging the return pawl 58 and of the spring urging the positioning pawl 59 upon release.

When the control (brake/shift) lever 33 is swung in a sideways direction with the transmission element 52 engaging one of the driven portions 55, the transmission element 52 drives the takeup element 50, and the return pawl 58 moves away from the engaging portions 56. As a result, the shift wire 14b is pulled to provide a selected low speed. When the control (brake/shift) lever 33 is released, the control (brake/shift) lever 33 returns to the starting or rest position under the force of the return spring 40.

When the release lever 34 is pushed in a sideways direction, the control plate 51a is driven through the control projection 34c. Then, the engaging projection of the control plate 51a presses the positioning pawl 59 toward the control recesses 61, whereby the tip end of the positioning pawl 59 advances into one of the control recesses 61. The engaging projection of the control plate 51a also moves the return pawl 58 out of engagement with an engaging portion 56. As a result, the takeup element 50 returns by an amount corresponding to the gap between the positioning pawl 59 and the control recess 61, i.e. within one pitch of the engaging portions 56. When the release lever 34 is released to return, the control plate 51a rotates to release the positioning pawl 59 out of engagement with the control recess 61 and to move the return pawl 58 into engagement with an adjacent engaging portion.

The release lever 34 is pivoted to the attachment end portion 33a of the control (brake/shift) lever 33 so that, when the control (brake/shift) lever 33 is swung forward to effect speed change, the release lever 34 is swung with the control (brake/shift) lever 33 instead of moving relative to the latter. This allows the control (brake/shift) lever 33 to be swung without being obstructed by the release lever 34.

In the illustrated embodiment so far described, the control (brake/shift) lever 33 is swingable in the direction perpendicular to the direction of pivotal movement of the control (brake/shift) lever 33, i.e. axially of the brake pivot axis P. Instead, the control (brake/shift) lever 33 can be swingable in an inclined direction relative to the brake pivot axis P. It will serve the purpose if the control (brake/shift) lever 33 is swingable in a direction different from the direction of pivotal movement of the control (brake/shift) lever 33 within a range that does not result in a change speed at times of braking.

When braking the bicycle with a hand holding the lower extreme position of the curved portion of the dropped handlebar 13, the cyclist can extend the index and middle fingers, for example, of the hand holding the curved portion, hook the control (brake/shift) lever 33 and draw the control (brake/shift) lever 33 toward the braking position, i.e. toward the curved portion. This lever operation causes the cable winding mechanism 32 to pivot on the brake pivot axis P with the base member 31. This pivotal movement of the control (brake/shift) lever 33 pulls the brake wire 15b thereby to brake the bicycle 10.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle control device comprising:
   a support member having a mounting portion configured and arranged to be coupled to a bicycle handlebar, said support member extending in a lengthwise direction and further having a distal end longitudinally spaced from said mounting portion, said support member including a gripping portion disposed between said mounting portion and said distal end, said mounting portion including a clamp member having a clamping plane that bisects said clamp member;
   a cable winding mechanism coupled to said support member, and having a cable attachment point; and
   a control lever operatively coupled to said cable winding mechanism, said control lever including an attachment end portion and a shift operating portion extending outwardly from said distal end of said support member and extending from said attachment end portion to a free end of said control lever,
   said attachment end portion of said control lever being pivotally coupled to said support member to move between a rest position and a shifting position about a shift pivot axis that extends longitudinally through said mounting portion and said distal end, said clamping plane intersecting with said shift pivot axis at said gripping portion between said clamp member and said distal end, and
   said shift operating portion of said control lever being configured and arranged to have a majority of said shift operating portion disposed along a line that is angled relative to said shift pivot axis by approximately an angle between forty-five degrees and fifty-five degrees at said rest position and that passes through said attachment end portion at said shift pivot axis.

2. The bicycle control device according to claim 1, wherein said cable winding mechanism is pivotally mounted on said shift pivot axis.

3. The bicycle control device according to claim 1, wherein
   said cable winding mechanism includes a takeup element, a biasing element that is configured and arranged to apply a biasing force in a first rotational direction, and a transmission element operatively coupled to rotate said takeup element, and
   said attachment end portion of said control lever being operatively coupled to said transmission element to rotate said takeup element against said biasing force of said biasing element in a second rotational direction in response to movement of said control lever from said rest position to said shifting position.

4. The bicycle control device according to claim 3, further comprising
   a secondary shift lever being operatively coupled to said cable winding mechanism and being movably coupled relative to said support member about a secondary shift pivot axis to move between a rest position and a shift position.

5. The bicycle control device according to claim 4, wherein
   said cable winding mechanism includes a takeup element, a biasing element that is configured and arranged to apply a biasing force in a first rotational direction, a transmission element operatively coupled to rotate said takeup element, and a release element operatively to release said takeup element,
   said attachment end portion of said control lever being operatively coupled to said transmission element to rotate said takeup element against said biasing force of said biasing element in a second rotational direction in response to movement of said control lever from said rest position of said control lever to said shifting position of said control lever, and
   said secondary shift lever being configured and arranged to move said release element to release said takeup element such that said takeup element rotates under said biasing force of said biasing element in response to movement of said secondary shift lever from said rest position of said secondary shift lever to said shifting position of said secondary shift lever.

6. The bicycle control device according to claim 4, wherein
   said control lever further being pivotally coupled to said support member about a non-shift pivot axis.

7. The bicycle control device according to claim 6, wherein
   said control lever further includes a brake wire attachment point configured and arranged relative to said non-shift pivot axis to pivot said control lever about said non-shift pivot axis relative to said support member.

8. The bicycle control device according to claim 1, further comprising
   a secondary shift lever being operatively coupled to said cable winding mechanism and being movably coupled relative to said support member about a secondary shift pivot axis to move between a rest position and a shift position.

9. A bicycle control device comprising:
   a support member having a gripping portion and a mounting portion configured and arranged to be coupled to a bicycle handlebar, said mounting portion including a clamp member having a clamping plane that bisects said clamp member;
   a cable winding mechanism coupled to said support member, and having a cable attachment point; and
   a control lever operatively coupled to said cable winding mechanism, said control lever including an attachment end portion and a control operating portion extending outwardly from said support member and extending from said attachment end portion to a free end of said control lever, said attachment end portion of said control lever being pivotally coupled to said support member about a shift pivot axis to move between a rest position and a shifting position, said attachment end portion of said control lever further being pivotally coupled relative to said support member about a brake pivot axis that is angled relative to said shift pivot axis, said clamping plane intersecting with said shift pivot axis at said gripping portion, and said control operating portion of said control lever being configured and arranged to have a majority of said control operating portion disposed along a line that is angled relative to said shift pivot axis by approximately an angle between forty-five degrees and fifty-five degrees at said rest position and that passes through said attachment end portion at said shift pivot axis.

10. The bicycle control device according to claim 9, wherein said cable winding mechanism is pivotally mounted on said shift pivot axis.

11. The bicycle control device according to claim 9, wherein said cable winding mechanism includes a takeup element, a biasing element that is configured and arranged to apply a biasing force in a first rotational direction, and a transmission element operatively coupled to rotate said takeup element, and said attachment end portion of said control lever being operatively coupled to said transmission element to rotate said takeup element against said biasing force of said biasing element in a second rotational direction in response to movement of said control lever from said rest position of said control lever to said shifting position of said control lever.

12. The bicycle control device according to claim 11, further comprising a secondary shift lever being operatively coupled to said cable winding mechanism and being movably coupled relative to said support member about a secondary shift pivot axis to move between a rest position and a shift position.

13. The bicycle control device according to claim 12, wherein said cable winding mechanism includes a takeup element, a biasing element that is configured and arranged to apply a biasing force in a first rotational direction, a transmission element operatively coupled to rotate said takeup element, and a release element operatively to release said takeup element, said attachment end portion of said control lever being operatively coupled to said transmission element to rotate said takeup element against said biasing force of said biasing element in a second rotational direction in response to movement of said brake/shift lever from said rest position of said control lever to said shifting position of said control lever, and said secondary shift lever being configured and arranged to move said release element to release said takeup element such that said takeup element rotates under said biasing force of said biasing element in response to movement of said secondary shift lever from said rest position of said secondary shift lever to said shifting position of said secondary shift lever.

14. The bicycle control device according to claim 12, wherein said control lever further includes a brake wire attachment point configured and arranged relative to said brake pivot axis to pivot said control lever about said brake pivot axis relative to said support member.

15. The bicycle control device according to claim 9, further comprising a secondary shift lever being operatively coupled to said cable winding mechanism and being movably coupled relative to said support member about a secondary shift pivot axis to move between a rest position and a shift position.

16. A bicycle control device comprising:

a support member having a mounting portion configured and arranged to be coupled to a bicycle handlebar and a distal end longitudinally spaced from said mounting portion, said support member having a gripping portion disposed between said mounting portion and said distal end;

a cable winding mechanism coupled to said support member, and having a cable attachment point; and a control lever operatively coupled to said cable winding mechanism, said control lever including an attachment end portion and a shift operating portion extending outwardly from said distal end of said support member and extending from said attachment end portion to a free end of said control lever, said attachment end portion of said control lever being pivotally coupled to said support member to move between a rest position and a shifting position about a shift pivot axis that extends longitudinally between said mounting portion and said distal end, said mounting portion having a clamping plane extending perpendicularly from the bicycle handlebar to intersect with said shift pivot axis at said gripping portion at an intersection point to form an acute angle as measured upwardly from said clamping plane and on a forward side of said shift pivot axis that is away from said mounting portion, and said shift operating portion of said control lever is configured and arranged to have a majority of said shift operating portion disposed along a line that is angled relative to said shift pivot axis by approximately an angle between forty-five degrees and fifty-five degrees at said rest position and that passes through said attachment end portion at said shift pivot axis.

17. The bicycle control device according to claim 16, wherein said acute angle is about 4.5 degrees.

18. The bicycle control device according to claim 16, wherein said cable winding mechanism is pivotally mounted on said shift pivot axis.

19. The bicycle control device according to claim 16, wherein said cable winding mechanism includes a takeup element, a biasing element that is configured and arranged to apply a biasing force in a first rotational direction, and a transmission element operatively coupled to rotate said takeup element, and said attachment end portion of said control lever being operatively coupled to said transmission element to rotate said takeup element against said biasing force of said biasing element in a second rotational direction in response to movement of said control lever from said rest position to said shifting position.

20. The bicycle control device according to claim 19, further comprising a secondary shift lever being operatively coupled to said cable winding mechanism and being movably coupled relative to said support member about a secondary shift pivot axis to move between a rest position and a shift position.

21. The bicycle control device according to claim 20, wherein said cable winding mechanism includes a takeup element, a biasing element that is configured and arranged to apply a biasing force in a first rotational direction, a transmission element operatively coupled to rotate said takeup element, and a release element operatively to release said takeup element, said attachment end portion of said control lever being operatively coupled to said transmission element to rotate said takeup element against said biasing force of said biasing element in a second rotational direction in response to movement of said control lever from said rest position of said control lever to said shifting position of said control lever, and said secondary shift lever being configured and arranged to move said release element to release said takeup element such that said takeup element rotates under said biasing force of said biasing element in response to movement of said secondary shift lever from said rest position of said secondary shift lever to said shifting position of said secondary shift lever.

22. The bicycle control device according to claim 20, wherein said control lever further being pivotally coupled to said support member about a non-shift pivot axis.

23. The bicycle control device according to claim 22, wherein said control lever further includes a brake wire attachment point configured and arranged relative to said non-shift pivot axis to pivot said control lever about said non-shift pivot axis relative to said support member.

24. The bicycle control device according to claim 16, further comprising a secondary shift lever being operatively coupled to said cable winding mechanism and being movably coupled relative to said support member about a secondary shift pivot axis to move between a rest position and a shift position.

* * * * *